United States Patent [19]

Miyazawa et al.

[11] Patent Number: 4,935,754

[45] Date of Patent: Jun. 19, 1990

[54] ELECTROPHORETIC RECORDING APPARATUS

[75] Inventors: Yoshinori Miyazawa; Makoto Fujino; Hideo Yamazaki, all of Suwa, Japan

[73] Assignee: Seiko Epson Corporation, Tokyo, Japan

[21] Appl. No.: 385,849

[22] Filed: Jul. 26, 1989

[30] Foreign Application Priority Data

| | | | |
|---|---|---|---|
| Jul. 26, 1988 | [JP] | Japan | 63-186033 |
| Aug. 17, 1988 | [JP] | Japan | 63-204179 |
| Sep. 30, 1988 | [JP] | Japan | 63-246707 |
| Oct. 19, 1988 | [JP] | Japan | 63-263070 |
| Apr. 27, 1989 | [JP] | Japan | 1-108565 |

[51] Int. Cl.$^5$ .............. G01D 15/00

[52] U.S. Cl. .............. 346/150; 346/160.1

[58] Field of Search .............. 346/150, 153.1, 160.1; 355/256-258, 246, 261

[56] References Cited

U.S. PATENT DOCUMENTS

| | | | |
|---|---|---|---|
| 4,493,550 | 1/1985 | Takekida | 355/256 |
| 4,855,768 | 8/1989 | Iino et al. | 346/160.1 |

*Primary Examiner*—Arthur G. Evans

*Attorney, Agent, or Firm*—Blum Kaplan

[57] ABSTRACT

An electrophoretic recording apparatus for use with a developer having charged pigment dispersed in a dispersion medium which includes a plurality of electrical field generators for selectively applying a voltage across the developer fed onto the recording paper. Each electric field generator includes a recording electrode and opposed electrode provided on opposite sides of the recording paper. The recording electrode includes a main electrode and an auxiliary electrode dispersed about the main electrode to suppress spread of the electric field and yield recording of higher resolution.

17 Claims, 7 Drawing Sheets

FIG. 7(a)
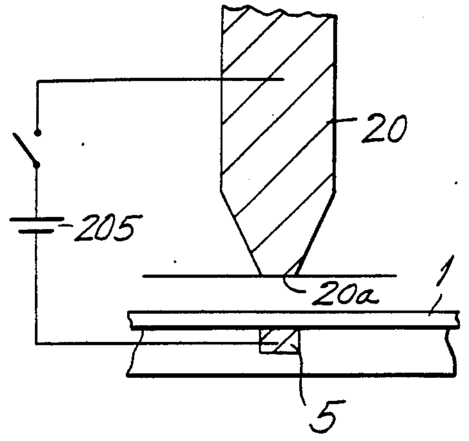
FIG. 8(b)
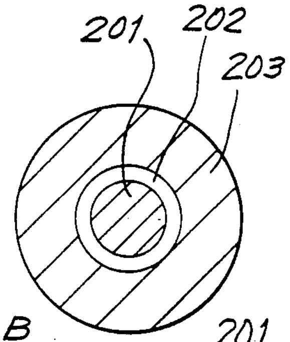
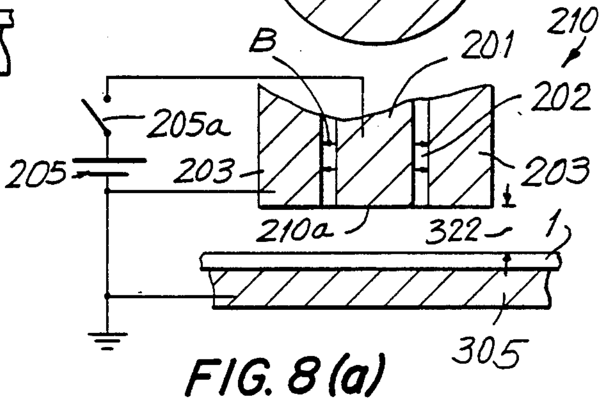
FIG. 8(a)
FIG. 7(b)
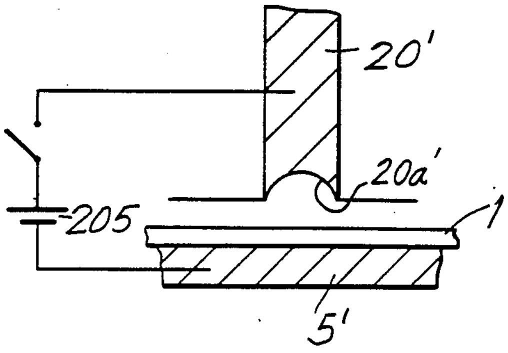
FIG. 8(d)
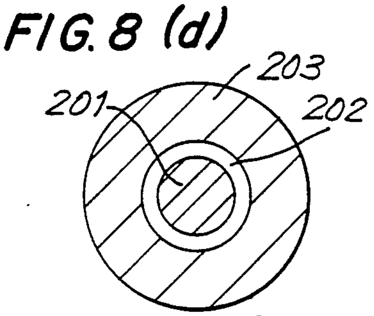
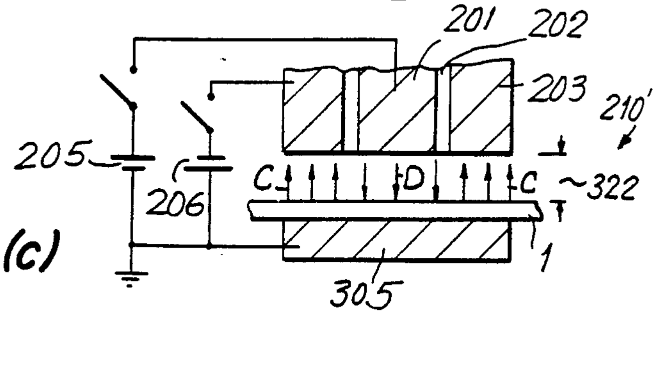
FIG. 8(c)

FIG. 9 (a)
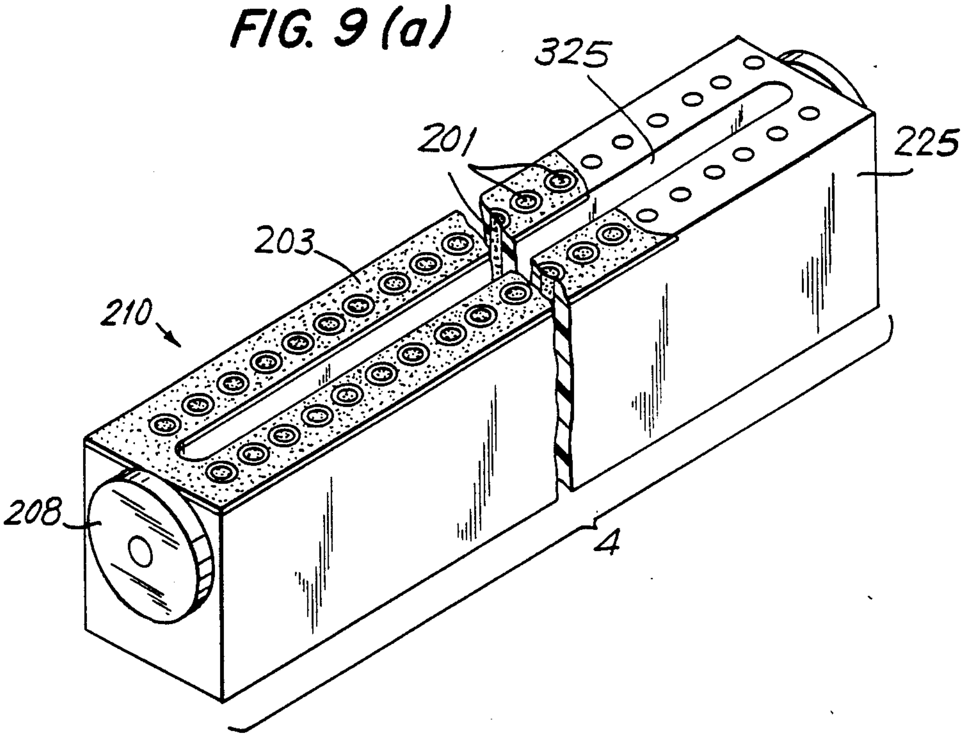
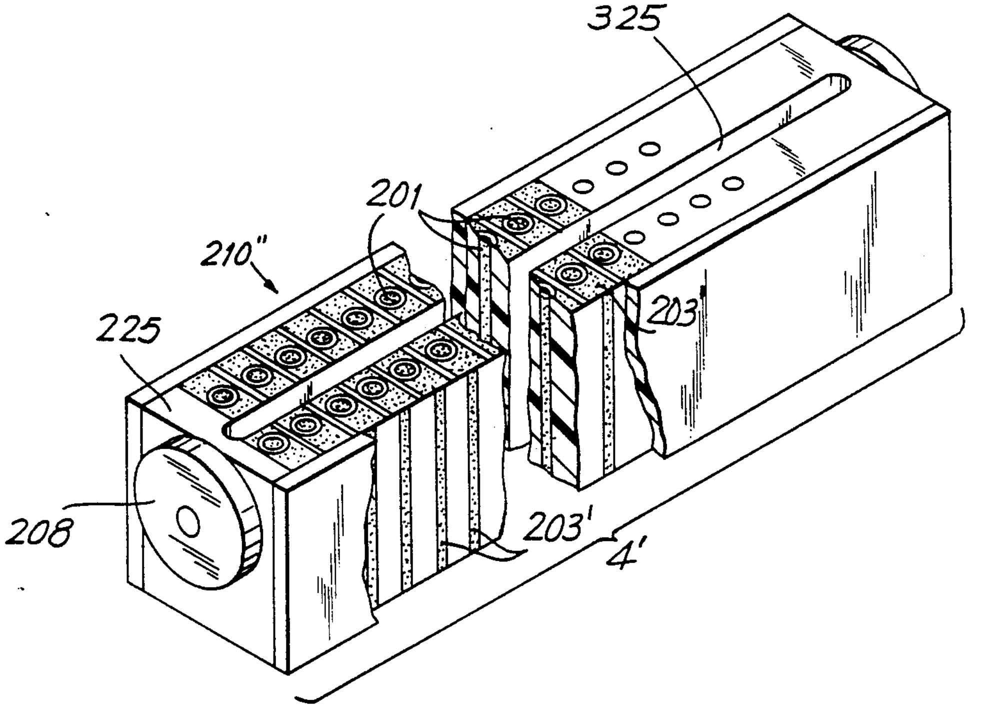
FIG. 9 (b)

ELECTROPHORETIC RECORDING APPARATUS

BACKGROUND OF THE INVENTION

The present invention relates to a recording apparatus utilizing a liquid developing medium toner and, in particular, to an electrophoretic recording apparatus.

A wet recording apparatus utilizing an electrophotographic structure including a photosensitive drum is known in the art. The photosensitive drum is charged and exposed to produce a static latent image formed thereon. The image is then developed in a liquid developer to form a readable image. Surplus developer stuck to the surface of the photosensitive drum is removed and a pigment image is transferred to a recording paper to be fixed thereon. Another known wet recording method utilizes a static latent image formed on a photosensitive recording paper developed in a liquid developer so that the image becomes fixed on the paper.

Further, an electrostatic recording apparatus is known in the art. A conventional electrostatic recording apparatus is such that a high voltage is impressed on an electrostatic recording electrode, a static latent image is formed on an electrostatic recording paper having a high resistance layer by corona discharge. The image is then developed in a developer. Surplus developer is removed and an image is fixed on the recording paper.

An electrophoresis method is known from U.S. Pat. No. 4,330,788 and "Electrophoretic Recording of Continuous Tone Images", *Journal of Applied Photographic Engineering,* vol. 6, June 1980. An electrode is moveable relative to a conductive recording medium within a developer. The developer contains solid particles a pigment made of solid particles suspended in a solvent. The solid particle migrate under the influence of an electric field towards the paper to form an image.

The prior art wet recording methods and apparatus have been satisfactory. However, they suffer from the following disadvantages. Utilizing a photosensitive drum inherently results in an apparatus which is very complicated and large in size. Additionally, the image deteriorates during the transfer process. The embodiment utilizing a photosensitive paper requires the use of expensive and special recording paper increasing the cost of use. Whereas, in the electrostatic reproducing apparatus, because a static latent image is formed through corona discharge, a continuous gradation of a pigment density is extremely hard to control. Accordingly, the toner (pigment) density is binary. Therefore, a half tone of inferior quality is produced during smooth tone reproduction in an area of toner gradation. Additionally, a static latent image forming member and developing member are formed as separate pieces resulting in an overly large apparatus.

The method for electrophoresis disclosed in U.S. Pat. No. 4,330,788 utilizing a line of an electric force extending from an electrode to an image carrier tends to spread. Therefore, an area larger than the sectional area of the electrode becomes developed and high resolution cannot be realized. Then, because the construction is such that the electrode moves in an orthogonal direction to that in which the image carrier is scanned and many electrodes cannot be packaged in a high density formation, a long time is required for obtaining a final image, thus limiting the speed of operation. Additionally, conductive recording paper must be used to obtain a high resolution again requiring a special paper.

Accordingly, it is desirable to provide an improved electrophoretic printer with electrodes configured to provide high resolution which overcome these problems associated with the prior art.

SUMMARY OF THE INVENTION

Generally speaking, in accordance with the invention, an electrophoretic printer includes a plurality of electrodes for applying a voltage and forming a field between an electrode pair. A developer feed feeds liquid developer having a charged colorant dispersed in dispersion medium. The developer fed from the developer feed is disposed within an electric field controlled by the field forming means. Recording paper is also disposed within the electric field to form a colored image on the recording paper in accordance with the electric field. A recording electrode is provided on one side of the paper and an opposite electrode is provided on the opposite side of the paper from the recording electrode to form the electrode pair.

In an exemplary embodiment, the recording electrode may be structured to include a main electrode and auxiliary electrode formed in a double packing formation to be packaged in high density.

Accordingly, it is an object of the invention to provide an improved electrophoretic recording apparatus.

It is another object of the invention to provide a recording apparatus which is small in size, simple in construction and capable of forming a high quality image.

Yet another object of the invention is to provide a recording apparatus which does not require a static latent image forming member while still providing recording with a charged pigment dispersed in a developer which migrates towards and is attached onto the recording paper through electrophoresis under the influence of an electric field to form the image.

A further object of the invention is providing an electrophoretic recording apparatus which is free from deterioration of the image resulting from an image transfer process.

Still other objects and advantages of the invention will in part be obvious and will in part be apparent from the specification.

The invention accordingly comprises the features of construction, combinations of elements, and arrangement of parts which will be exemplified in the constructions hereinafter set forth and the scope of the invention will be indicated in the claims.

BRIEF DESCRIPTION OF THE DRAWINGS

For a fuller understanding of the invention reference is had to the following description taken in connection with the accompanying drawings in which:

FIGS. 7*a* and 7*b* are sectional views of electrode configurations for use in printing devices in accordance with invention;

FIG. 8*a* is a sectional view of an electrode constructed in accordance with the invention;

FIG. 8*b* is a top plan view of the electrode of FIG. 8*a;*

FIG. 8*c* is a sectional view of an electrode constructed in accordance with the invention;

FIG. 8*d* is a top plan view of the electrode of FIG. 8*c;*

FIGS. 9*a* and 9*b* are perspective sectional views of developing heads constructed in accordance with the invention;

DETAILED DESCRIPTION OF THE PREFERRED EMBODIMENTS

Figure 1:
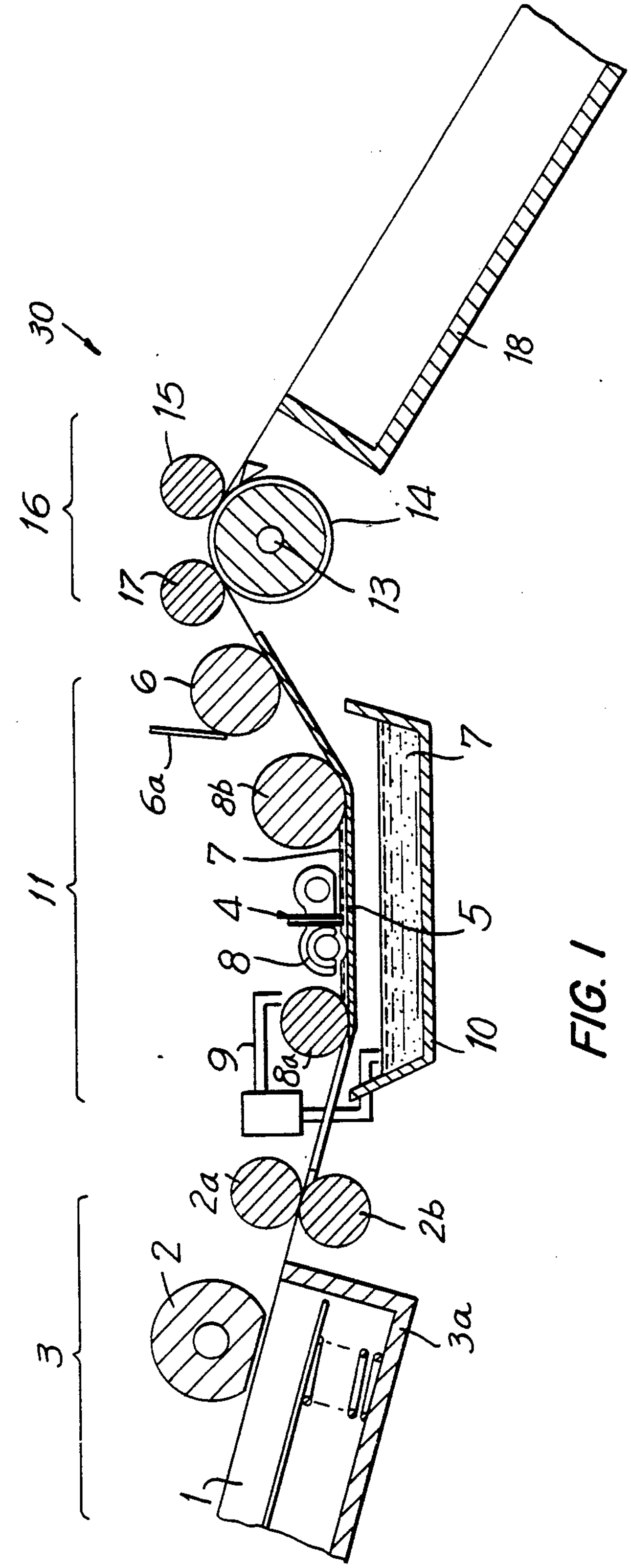
FIG. 1 is a elevational view of an electrophoretic recording device constructed in accordance with the invention.

An electrophoretic recording device generally shown as constructed in accordance with a first embodiment of the invention is shown in FIG. 1. Electrophoretic recording device 30 includes a paper feeder section generally indicated as 3, a developing device generally indicated as 11, and an image fixing device generally indicated as 16. A recording medium 1, such as paper is delivered from paper feeder 3 to developing device 11 and to an image fixing device 16.

Paper 1 is stored in a paper bale 3*a.* A feed roller 2 feeds paper towards rollers 2*a,*2*b* in the direction of developing device 11.

Developing device 11 includes a roller 8*a* for feeding paper 1 towards a developer head 4. Developing device 11 includes a vessel 10 filled with a developer 7. Developer 7 is fed from developer vessel 10 to the vicinity of developer head 4 by a developer feed pipe 9. A gap holder 8 maintains a gap between paper 1 and developing head 4. Developing head 4 is provided with a multiplicity of recording electrodes. Developer 7 fills the gap between developing head 4 and opposite electrode 5. During development, paper 1 is passed through development device 11 by rollers 8*a* and 8*b* provided on either side of developing head 4. Paper 1 is now passed through developer 7 and developing head 4 and is coated with developer 7. The surplus developer 7 is removed from paper 1 by a roller 6. The excess developer is removed from roller 6 by a scraper 6*a.*

Image fixing device 16 makes the image formed by the nonsurplus developer on paper 1 permanent. Paper 1 passes between a heat roller 14 and pressure rollers 15 and 17. Heat roller 14 includes a lamp 13 for providing the heat causing the wet image formed on paper 1 to be fixed to paper 1. Paper 1 is then transported to a collection bin 18.

Figure 2:
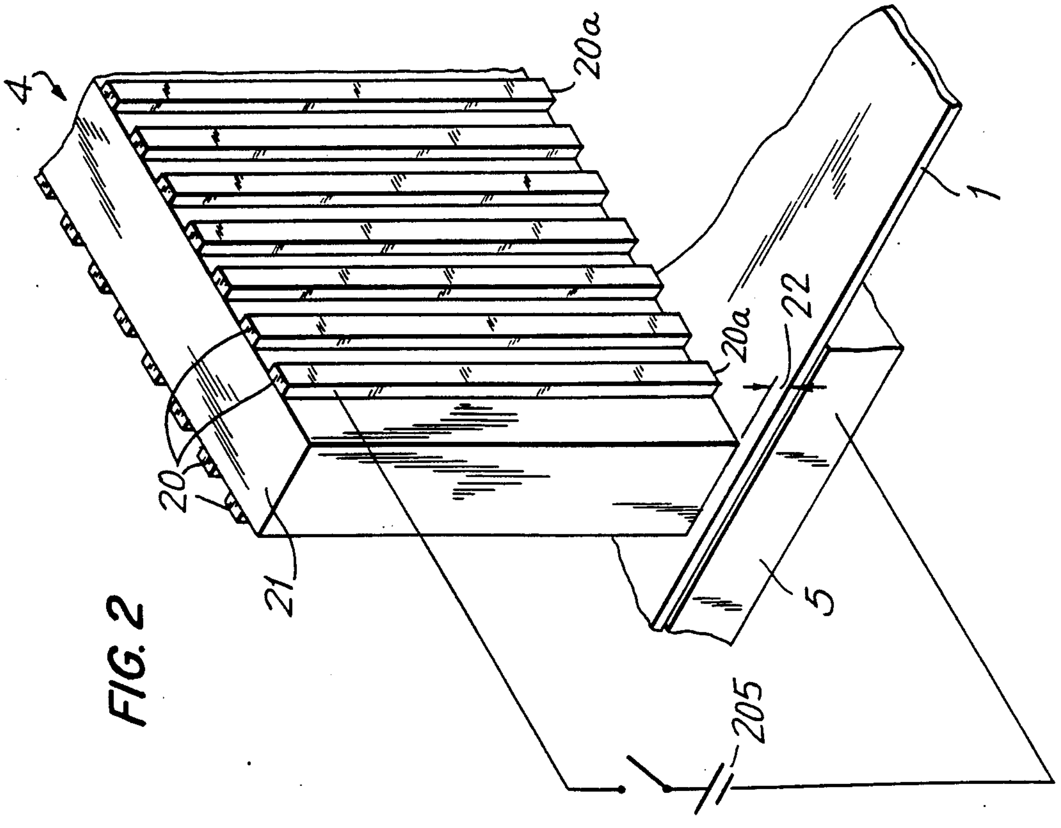
FIG. 2 is a perspective view of a developing head for use in the recording device of FIG. 1 in accordance with the invention.

Reference is now made to FIG. 2 in which developing head 4 is described in greater detail. Developing head 4 includes a plurality of electrodes 20 formed in two rows, on either side of an insulating substrate 21. Opposite electrode 5 acts as another electrode so that a voltage may be applied between any one of recording electrodes 20 and opposite electrode 5. Opposite electrode 5 is positioned across a gap from developing head 4 to allow paper 1 to pass therebetween. A gap 22 is formed between developing head 4 and paper 1. Accordingly, the voltage is applied across gap 22 between opposite electrode 5 and developing head 4. A voltage generating mechanism 205, represented as a voltage source with switch, is provided to control the application of the voltage between an electrode 20 and opposite electrode 5.

To form a one dot image which is a minimum pixel unit, a voltage is applied at one recording electrode 20 to cause a potential difference therebetween and the opposite electrode. The voltage is applied through developer 7 which fills gap 22 and recording paper 1 in developing device II. Developer 7 is formed as a colloidal suspension having charged pigment particles so that the charged pigment particles migrate along the electric field formed on an end surface portion 20*a* of recording electrode 20 to be attached to recording paper 1. This forms the picture image.

When a voltage is selectively applied by voltage generator 205, so that recording electrodes 20 will hold a positive potential relative to opposite electrode 5, developer 7 which includes a colloidal positively charged pigment dispersed within the solvent, is subject to an electrostatic force which moves the pigment away from recording electrodes 20 towards recording paper I in response to the electric field formed between recording electrode 20 and the opposite electrode 5. The charged pigments accumulate on the surface of paper 1. In this way, the pigment contained within developer 7 may be selectively attached to paper 1. In order to maintain gap 22 between end surface 20*a* of each recording electrode 20 and the surface of paper 1 with high precision, a gap holder having a roller comes in contact with the surface of paper 1 and maintaining it in position within gap 22.

Paper 1 having the pigment selectively attached to its surface passes roller 6 which rotates at a circumferential speed different from the traveling speed of paper 1. Thus, roller 6 acts as a squeeze roller spaced a small distance from paper 1 so that the developer 7 which falls within this small gap is subjected to a force caused by fluid viscosity and scraped off the surface of paper 1 by roller 6. Accordingly, only the accumulated pigment image and a small amount of developer 7 remain on paper 1 to form an image free from background staining. Paper 1 is then passed between heat roller 14, which is heated by heater lamp 13, and pressure roller 15. The surface of pressure roller 15 is roughened so as not to disturb the image which is now affixed to paper 1 due to heating. Developer 7 includes an evaporable solvent and the pigment. Accordingly, paper 1 retains a residual solvent which has been evaporated by image fixing device 16 and the pigment image which is now fixed to the paper. A halogen lamp may be used as lamp 13 to heat roller 14.

As described above, a colorant is fixed to recording paper 1 due to electrophoresis. Accordingly, where the voltage to be applied is constant, the quantity of accumulated colorant, or pigment which becomes attached to the paper increases directly with the voltage application time. Additionally, where a voltage is applied for the same time period, the larger the voltage applied, the larger an electrostatic force is applied and the quantity of colorant which accumulates and becomes attached to paper 1 also increases. By providing such a structure, and by modulating and controlling the voltage application time, the pigment density can be continuously controlled according to a desired quantity of pigment which is to be attached. The pigment density can also be controlled by the above construction wherein either one or both the applied voltage and the application time can be controlled.

In order to increase resolution it is necessary that the area of the end surfaces 20*a* of recording electrodes 20 be minimized and that gap 22 between paper 1 and recording electrode 20 be as small as possible. This prevents an electric field produced by each recording electrode 20 from expanding from recording electrodes 20 towards paper 1. In an exemplary embodiment, gap 22 is limited to between about 0.05 to 0.3 mm to prevent an expansion of the electric field. Further, the distance between adjacent recording electrodes 20 is larger than the gap between paper I and recording electrodes 20, thereby suppressing the influence of the electric field formed by adjacent electrodes 20 on each other. Recording electrodes 20 are constructed in plural rows to satisfy all the above conditions. Recording electrodes 20 may be disposed to have more than the two plural rows shown.

Figure 3:
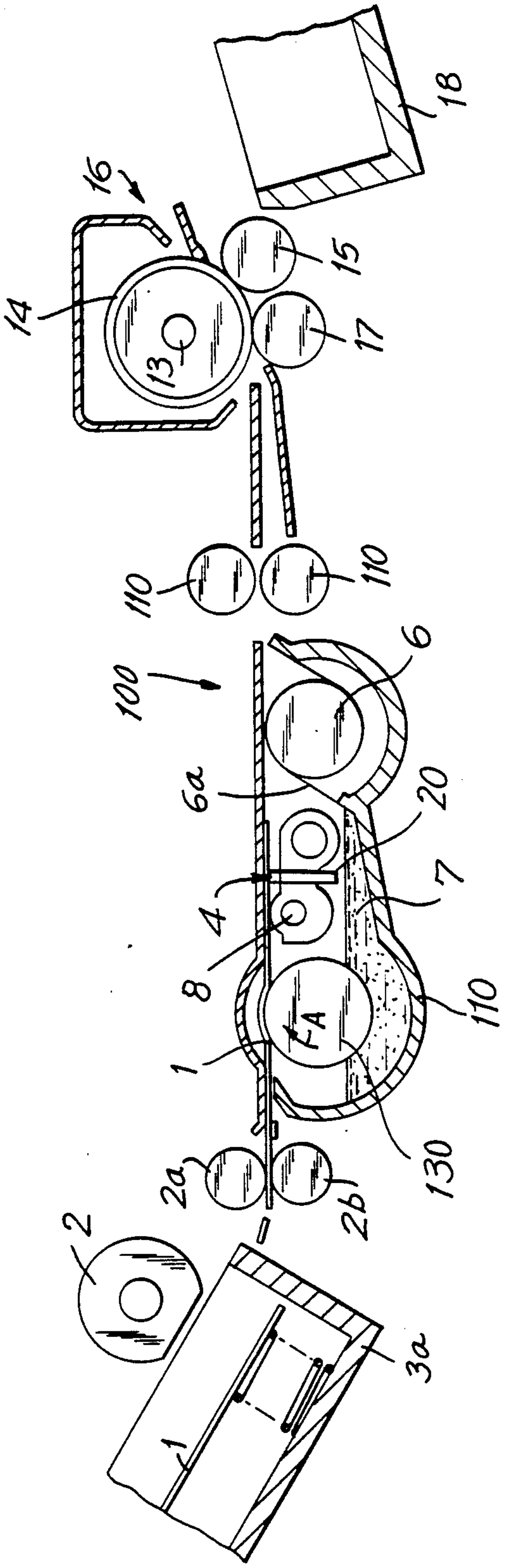
FIG. 3 is an elevational view of an electrophoretic recording device constructed in accordance with a second embodiment of the invention.

An electrophoretic printer 100 constructed in accordance with a second embodiment of the invention is shown in FIG. 3. Similar elements in structure in printer 100 is identified by like numerals used to describe printer 30 of FIG. 1. The primary difference between printer 100 and printer 30 is that developer head 40 in printer 100 is positioned below paper 1 and developer 7 is applied by a roller 130.

A vessel 110 positioned below paper 1 in the direction of travel of paper 1 contains developer 7. A spongy roller 130 retains developer 7 and rotates in the direction of an arrow A to apply developer 7 to paper 1 as paper 1 passes spongy roller 130. Paper 1 then passes above developing head 4 and recording electrodes 10 where an electric field is applied to accumulate developer 7 on paper 1. Surplus developer 7 is then removed by squeeze roller 6 and passed by rollers 110 through image fixing device 16 to collection bin 18.

Figure 4:
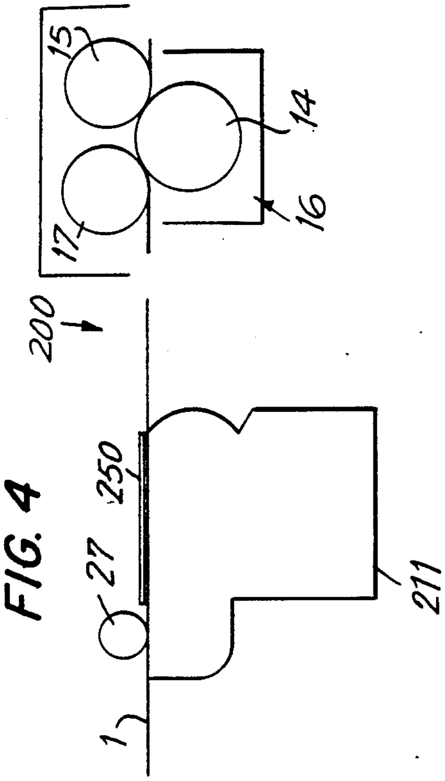
FIG. 4 is a schematic view of an electrophoretic recording device constructed in accordance with a third embodiment of the invention.
Figure 5:
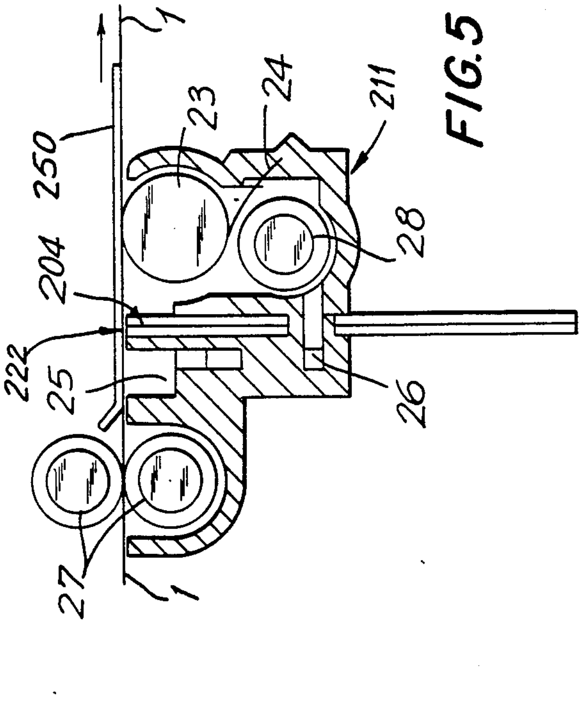
FIG. 5 is a sectional view of a developing device constructed in accordance with the third embodiment of the invention.
Figure 6:
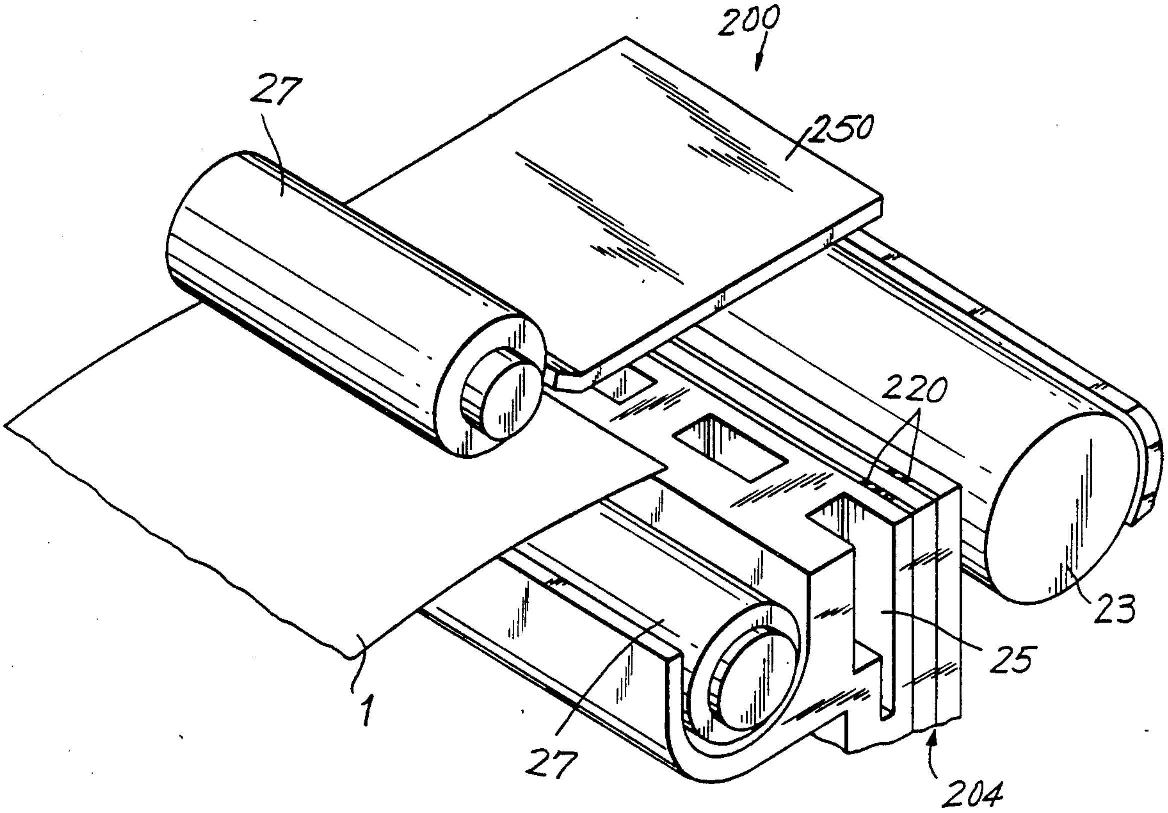
FIG. 6 is a perspective view of the electrophoretic recording device constructed in accordance with the third embodiment of the invention.

Reference is now made to FIGS. 4–6 in which a printer generally shown as 200, constructed in accordance with a third embodiment of the invention is shown. Again, like numerals are used to indicate like structure of printer 30 of FIG. 1. Paper 1 is fed from a feeder and passes through a developing device 211 where pigment image is formed on paper 1. Paper 1 is then fed to image fixing device 16 where the pigment image is fixed. As shown in greater detail in FIG. 5, a developer feed device 211 includes a developing head 204, and a pair of feed rollers 27 for feeding paper 1 towards developer head 204. A developer delivery hole 25 is provided adjacent electrodes 220 to deliver developer 7 to paper 1 as it travels past developer head 204 and a developer suction hole 26 for intaking excess developer 7. Developer head 204 is again provided with a plurality of recording electrodes 220 which are independently controlled to apply voltages.

A squeeze roller 23 supported within developer device 211 removes excess developer from paper 1 by rotating at a speed different than that at which paper 1 travels through developer device 211. A scraper 24 for removing developer retained on squeeze roller 23 is supported within developer device 211. A roller 28 for stirring developer 7 is provided below squeeze roller 23.

A support member 205 is disposed across from developing head 204 and maintains the gap between paper 1 and developer head 204. Support member 205 functions as an opposite electrode in cooperation with electrodes 220 of developer head 204. Once paper 1 has been processed by developing device 211, it is passed to image fixing device 16 which is constructed similarly to printer 30.

A perspective view of developer device 211 is shown in FIG. 6. Electrodes 220 are again provided in two rows. An electric field controlled by recording electrodes 220 of developer head 204 is utilized to accumulate the pigment dispersed in developer 7 at specific points of paper 1. Developer 7 is delivered to the gap between support member 250 and developer head 204 from delivery hole 25. Accordingly, the necessary quantities of developer 7 are efficiently fed within the minute gap between paper 1 and recording electrodes 220. Recording paper 1 is pushed towards support member 250 by the pressure generated by the delivery of developer 7 so that gap 222 between recording paper and recording electrodes 20 is secured according to the space between support member 250 and the end surfaces of recording electrodes 220.

By selectively applying an electric field between respective recording electrodes 220 and support member 250, the pigment within developer 7 is selectively applied to the surface of paper 1. Surplus developer 7 is removed by squeeze roller 23. The excess developer on squeeze roller 23 is removed by scraper 24. The developer 7 removed by scraper 24 is then fed to developer suction hole 26 and recirculated through feeder delivery hole 25 to be used again. Stirring roller 28 is provided with a threaded groove on its surface to provide redispersion of the pigment within developer 7 and to help deliver developer 7 to suction hole 26. As described earlier, when paper 1 has been processed it has a residual solvent evaporated by the fixing device (not indicated) and a pigment image fixed thereon. Additionally, as in printer 30 developer density is controlled by controlling either one or both of the applied voltage and the voltage application time.

In each of the electrophoretic devices described, the physical structure of the individual electrodes may be varied to provide desired results. For example, as shown in FIG. 7*a*, recording electrode 20 may be a tapered stylus shape to provide high resolution efficiency. Opposite electrode 5, which is disposed opposite recording electrode 20 across the gap, is dimensioned to have an area less than or equal to the area of end surface 20*a* of recording electrode 20. Such a structure suppresses the spread of the electric field produced by recording electrode 20. A voltage is applied between recording electrodes 20 and the opposite electrode 5 by voltage generator 205. Because the areas of the generation point and termination point of an electric force line generated between recording electrode 20 and the opposite electrode 5 are mutually made smaller, the electric force is concentrated to provide high resolution recording.

In FIG. 7*b* a recording electrode 20' is formed with a concave end surface 20*a'*. When voltage generator 25 causes a voltage to be applied between recording electrode 20' and the opposite electrode 5', the electric field is formed without spreading because the line of electric force becomes dense at the central portion immediately under recording electrode end surface 20*a'*. This is due to the line of electric force being produced from a conductive member being orthogonal to the surface of the conductive member. Concentration of the electric force line may be further intensified by shaping opposite electrode 5' as a strip with a width equivalent to or smaller than the width of recording electrode 20'. Further, when the side of recording electrode 20' or 20 is coated by an insulating material and only the end surface 20*a*,20*a'* is exposed to developer 7, a spreadfree picture image may also be formed on recording paper 1 as compared with the case where the side of recording electrode 20,20' is exposed to the developer.

Reference is made to FIGS. 8*a* and 8*b*, wherein another recording electrode constructed in accordance with another embodiment of the invention is shown. A recording electrode 210 is formed with a double electrode structure. A main electrode 201 is surrounded by an auxiliary electrode 203 and is separated therefrom by an insulating layer 202. An opposite electrode 305 is disposed opposite recording electrode 210 across a minute gap. Recording paper 1 is disposed on electrode 305. Developer is fed within a resulting gap 322 between paper 1 and recording electrode 210. A developer head contains an array of a plurality of recording electrodes formed in zigzag pattern of a plurality of rows of recording electrodes 210.

In FIG. 8*a* auxiliary electrode 203 is directly connected to opposite electrode 305 to provide an electrical equipotential between the two electrodes. Main electrode 201 is selectively connected to opposite electrode 305 through a switch 205*a*. When an image is to be recorded switch 205*a* is closed and voltage generator 205 causes a voltage to be applied between main electrode 201 and opposed electrode 305 producing an electric field. Charged pigment dispersed in developer migrates in the direction of recording paper 1. When pigment is positively charged, a ground potential is applied at opposite electrode 5 and auxiliary electrode 203 and a positive potential is applied at main electrode 201.

By providing the structure of recording electrode 210, the lines of electric force generated from a side of main electrode 201 tend to be formed across insulating layer 202 towards auxiliary electrode 203 as indicated by arrow B. Lines of electric force which tend to be formed in the direction of recording paper 1 from the sides of main electrode 201 are not generated and the resulting electric lines of force cause the pigment to migrate. Therefore, the electric field is limited to the electric force lines which tend to travel in the direction of recording paper 1 from the end surface 210*a* of main electrode 20!. Accordingly, the electric field is prevented from spreading and an image with higher resolution is attainable. Furthermore, if opposite electrode 305 is formed having a width equivalent to or less than the width of recording electrode 210, then electric field spread is more accurately suppressed and a reproduction even higher in resolution may be realized. When an image is not to be recorded, voltage generator 205 causes a voltage of equal potential between opposite electrode 5 and main electrode 201 to exist.

Referring now to FIG. 8*c*, a recording electrode 210' containing a second voltage generator 206 is shown. Like numerals are used for the same elements in FIGS. 8*a* and 8*b*. The major difference between recording electrode 210' and recording electrode 210 is that opposed electrode 305 is coupled to auxiliary electrode 203 by a second voltage generator 206 and coupled to main electrode 201 by first voltage generator 205. Accordingly, the voltage for generating an electric field whereby charged pigment particles in developer migrate to the recording paper is applied between opposite electrode 305 and a main electrode 201 by first voltage generator 205 and a voltage for generating an electric field counter to that electric field is applied between opposite electrode 305 and auxiliary electrode 203 by second voltage generator 206.

Where pigment is positively charged, a ground potential is applied at opposite electrode 305, a positive potential is applied at main electrode 201, and a negative potential is applied at auxiliary electrode 203. In this structure, it becomes desirable that a potential difference between main electrode 201 and opposite electrode 305 be greater than the potential difference between auxiliary electrode 203 and opposite electrode 305. The direction of electric fields formed on the boundary of insulating layer 202 extending virtually in the direction of paper 1 across gap 322 between electrode 210' and paper 1 are counter to each other as illustrated by arrows C and D. A pigment image formed on paper 1 may now show a sharp density gradient and clear contour, thus enhancing the resolution.

When an image is not to be reproduced, a voltage of equal potential to the opposite electrode 305 is applied at main electrode 201, and a potential the same as the potential applied on auxiliary electrode 203 during the time of picture image reproduction may be applied at auxiliary electrode 203, or an equal potential to the opposite electrode 305 may be applied thereto in synchronous timing with that applied to main electrode 201.

FIGS. 9*a*, 9*b* show a developing head 4 including recording electrodes 210, 210'. A plurality of main electrodes 201 are embedded in an electrode holder 225 formed of an insulating material. A voltage generator is coupled to each main electrode 201 from the bottom side of electrode holder 225 for selectively applying a voltage. Potential for causing the pigment within the developer to migrate towards recording paper 1 is provided at main electrode 201 to record an image and a potential equivalent to the potential of the opposite electrode is provided to main electrode 201 when no image is to be recorded. The top of electrode holder 225 is the surface which faces the recording paper. Common auxiliary electrode 203 is positioned on the top surface thereof so that it surrounds each main electrode 201. Auxiliary electrode 203 is electrically connected to the opposite electrode and has the same potential.

Electrode holder 225 is formed with a developer delivery groove 325 which provides developer between the paper to be recorded and recording electrodes 2!0. A gap holder 208 mounted on electrode holder 225 positions paper 1 relative to each electrode 210. Instead of keeping auxiliary electrode 203 at an equal potential to the opposed electrode, the recording electrode may be constructed so that the potential of auxiliary electrode 203 relative to the opposite electrode is counter to the potential of main electrode 201 to the opposite electrode during image reproduction.

In FIG. 9*b* another developing head 4' constructed in accordance with another embodiment is shown. A plurality of main electrodes 201 are embedded in electrode holder 225 of an insulating material. A voltage is selectively applied at each main electrode 201 by a voltage generator which is connected to the electrodes from a bottom side of electrode holder 225. Accordingly, a potential causing the pigment within the developer to migrate toward paper 1 is provided at main electrode 201 to produce an image. Conversely, a potential equal to the potential of the opposite electrode is provided at the main electrode 201 when an image is not to be produced.

A corresponding number of auxiliary electrodes 203' each correspond to a respective main electrode 201 are provided at the top of electrode holder 225 to surround each main electrode 201. A potential which is counter to the potential of main electrode 201 relative to the opposed electrode is provided at auxiliary electrodes 203 when reproducing an image. A potential equivalent to the opposite electrode is provided at auxiliary electrodes 203 when not producing an image.

A developer delivery groove 325 is formed in electrode holder 325 to deposit developer between recording paper and recording electrodes 210". Also, a gap holder 208 is provided for positioning the recording paper relative to each electrode 210".

A process for attaching pigment to paper for forming an image in printers 30, 100 and 200, can be completed without having to change the relative positions of the recording electrodes and the recording paper. In this case, the problem of providing a density gradient of a formed dot and resolution deterioration, which is caused by shifting of recording paper 1 during the voltage application time may be solved. The pigment can be attached while the recording paper stops in the course of a discontinuous paper transport. Repeated intermittent stops of carrying the recording paper are synchronized with the voltage application timing. It is particularly preferable that a satisfactory quality be realized by the aforementioned intermittent carrying where the image forming rate is governed by an electrophoresis caused by a mobility of the developer.

Figure 10:
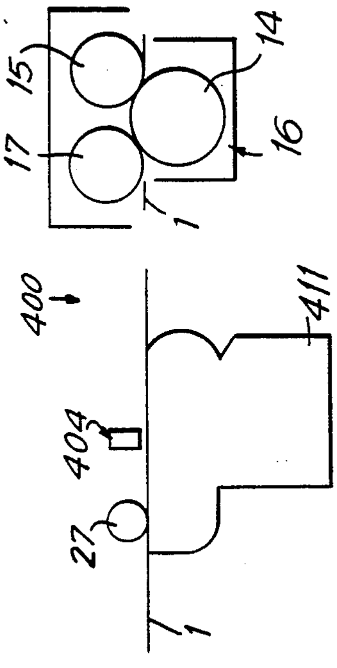
FIG. 10 is a schematic drawing of an electrophoretic recording device constructed in accordance with a fourth embodiment of the invention.
Figure 11:
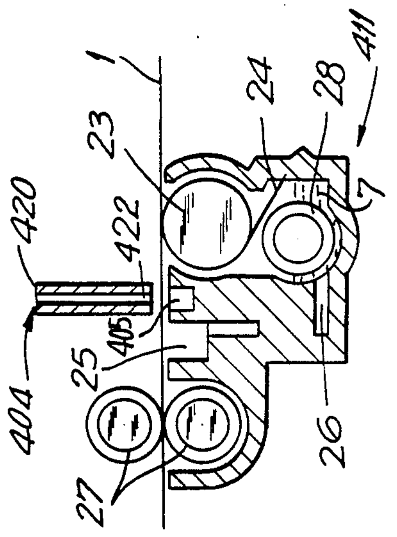
FIG. 11 is a sectional view of a developer constructed in accordance with the fourth embodiment of the invention.

Reference is now made to FIGS. 10 and 11 in which an electrophoretic recording device, generally indicated at 400, constructed in accordance with a fourth embodiment of the invention is shown. The primary difference between developer device 411 and developer device 211 of FIG. 5 is the positioning of the developing head above the recording paper. As seen in FIG. 10, paper 1 is delivered from a feeder to pass through developing device 411 wherein a pigment image is formed by developer head 404 positioned at the back of paper 1. The developed paper is then fed to image fixing device 16 where the pigment image is fixed to paper 1.

As shown in greater detail in FIG. 11, developer device 411 is includes rollers 27 for feeding paper 1 towards developer head 404. A conductive member 405, which acts as the opposite electrode is disposed across a gap 422 from head 404. The surface of paper 1 is against conductive member 405. Developer head 404 includes electrodes 420 for independently and selectively applying a voltage across the gap and paper 1 which are positioned on the opposite side of recording paper 1 from conductive member 405.

Developer 7 is fed to gap 422 through developer delivery hole 25. Excess developer is removed from paper 1 by squeeze roller 23 which rotates at a different speed from the speed with which paper 1 moves through developer device 411. Scraper 24 removes the excess developer 7 from squeeze roller 23. Stirring roller 28 stirs pigment into the developer and reclaimed developer is removed through suction hole 26 towards developer delivery hole 25.

A pigment is attached to the recording surface of paper 1, the surface facing conductive member 405 by controlling of the electric field applied from the back of paper 1. When recording electrodes 420 are negative in potential and conductive member 405 is positive in potential, the pigment formed of a colloid with positive charge pigment particles dispersed in a solvent is subjected to an electrostatic force toward the recording face of recording paper 1 by the electric field, and accumulated on the paper recording surface.

Figure 12:
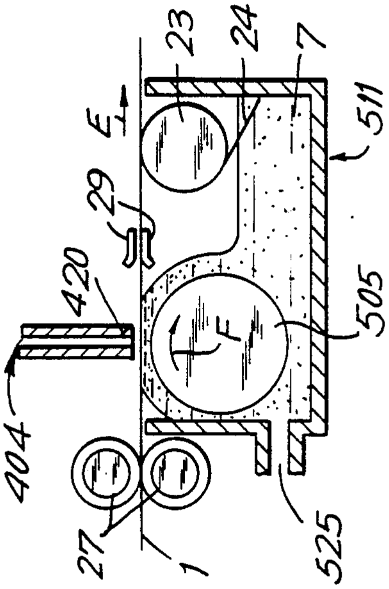
FIG. 12 is a cross-sectional view of a developer constructed in accordance with a fifth embodiment of the invention.

In FIG. 12 a developer device 511 constructed in accordance with a fifth embodiment of the invention is shown. Again, like structures which have been described earlier are indicated by reference numerals. The primary difference between developing device 511 and developing device 411 is the use of a roller as an opposite electrode 505.

Feed rollers 27 feed paper 1 in the direction of arrow E. A guide plate 29 is provided to guide paper 1 through developer device 511. Developer head 404 including recording electrodes 420 is disposed above paper 1. A developer roller 505 formed of a conductive material is positioned in developer vessel 10. Paper 1 is spaced apart from developer roller 505 by a small gap which is maintained by guide plate 29. Developer roller 505 rotates in the direction of arrow F. Developer 7 which is affixed to the peripheral surface of developer roller 505 is carried towards paper 1 and contacts paper 1 across the gap formed between roller 505 and paper 1. Accordingly, the gap becomes filled with developer 7 as in the earlier described embodiments.

Developer head 404 is disposed at a position opposite developer roller 505 on opposed side of recording paper 1. A voltage is applied between developer roller 505, which functions as the opposite electrode and recording electrodes 420 to control an electric field formed from behind paper 1. A pigment image is selectively affixed onto the recording surface of paper 1 which faces developer roller 505.

Paper 1 now contains pigment on the surface upon which an image is to be formed. Surplus developer on paper 1 is removed by squeeze roller 23. A scraper 24 is provided to remove excess developer from squeeze roller 23. Developer 7 is fed through a developer feed pipe 525 as needed. The recording paper is then fed to the image fixing device to fix the image to the paper.

Figure 13:
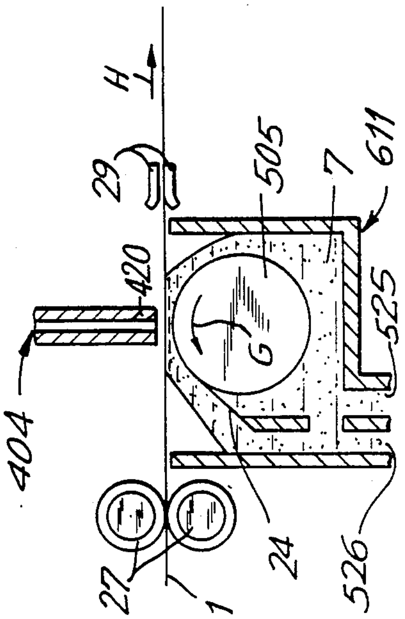
FIG. 13 is a sectional view of a developer constructed in accordance with a sixth embodiment of the invention.

Reference is now made to FIG. 13 in which a developer device 611 constructed in accordance with a sixth embodiment of the invention is shown. Again, like numerals are used to indicate like structure. Feed rollers 27 feed recording paper 1 in the direction of arrow H through guide plate 29 which maintains paper 1 in position and guides it along the paper path. Developer roller 505 made of a conductive material forms a small gap from developer head 404. Guide plate 29 maintains paper 1 in a position across the gap. Developer roller 505 is positioned within developer vessel so that when developer roller 505 rotates in the direction of arrow G, developer 7 is carried into the gap provided between developer roller 505 and paper 1.

Developer 7 is delivered to developer roller 505 through delivery hole 525 and excess developer is removed through a suction hole 526. Excess developer is removed from roller 505 by a scraper 24.

A pigment image is selectively formed on recording paper 1 by developer head 404 which includes recording electrodes 420. Developer head 404 is disposed at a position on the opposite side of paper 1 from developer roller 505. Developer roller 505 also functions as the squeeze roller for removing surplus developer from the recording surface of paper 1. Paper 1 which now has the pigment image formed on its surface has the pigment image fixed by an image fixing device.

In developing devices 411, 511 and 611, the recording electrodes 20 are provided at the back side of paper 1. Accordingly, the recording electrodes do not become soaked in developer as in the earlier embodiments and do not become stained by developer 7. Recording electrodes 420 may also be constructed in the various configurations described above. Paper 1 may be intermittently carried along the paper path preventing deterioration of resolution.

By providing an electrophoretic printer as described above, a system is provided which may be easily used for developing second and third colors on a recording paper which has already been subjected to development of a first color. Accordingly, a color recording apparatus for forming and affixing a color picture on recording paper through a plurality of developing devices having developers of various colors may be constructed. When the recording paper is rough or is developer osmotic, the recording paper surface may be treated with a solvent retardant which is used to prevent the forming of an image in the treated areas. Additionally, a developing device may be provided with paper in which a solvent has been applied beforehand.

By constructing the recording electrodes with electric field spread inhibiting constructions, electric field spread and electric force lines will be suppressed and high resolution recording may be realized using ordinary paper. This removes the need for charging, transferring the image or cleaning which must be done when using a photosensitive member. Additionally, because the construction is not based on an optical writing system, shading of certain parts is not required. Accordingly, a small sized reproducing apparatus of simple construction is realized. Furthermore, because there is no transfer process to pass the image during production of the image, there is no turbulence involved with the image. Additionally, pigment density can be controlled by adjusting the voltage applied to form the field or the voltage application time producing a high quality to the picture of reproducible tones. Because the system does not require a latent image to be formed before development, a high resistance developer solvent for retaining a static latent image is not needed and the range of developers which are utilized may include lower resistance solvents. Additionally, because no static latent image or photosensitive characteristics are required, ordinary recording paper may be used reducing cost and complexity of operation of the developer.

By charging a pigment within a developer and moving that pigment to attach to recording paper through electrophoresis under the influence of an electronic field formed by the recording electrodes, a high resolution image is formed. The quantity of pigment affixing to the paper is controlled by the intensity of the electric field formed, as well as the voltage application time so that density can be continuously controlled. Additionally, because the image is reproduced directly onto the recording paper, deterioration of the image due to a transfer process is eliminated, resulting in a higher quality of image.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language might be said to fall therebetween.

What is claimed is:

1. An electrophoretic recording apparatus for developing an image on a recording medium utilizing a developer including charged pigment dispersed in a dispersing medium, comprising:

electric field means including a recording electrode and an opposite electrode spaced apart with a gap therebetween and adapted to receive the recording medium therebetween and the electric field means for selectively applying at recording a voltage between said recording electrode and said opposite electrode;

the electric field means including electric field concentrating means for concentrating the electric field to avoid electric field spread;

developer feed means for feeding developer to one surface of said recording medium in the gap between the electrodes within an electric field controlled by said electric field means;

whereby an image is formed on said recording medium in accordance with application of said electric field.

2. The electrophoretic recording apparatus of claim 1, wherein one dimension of said opposite electrode is equivalent to or less than the corresponding dimension of said recording electrode.

3. The electrophoretic recording apparatus of claim 1, wherein said electric field forming means controls at least one of the voltage applied between said recording electrode and opposite electrode, and the application time of said voltage.

4. The electrophoretic recording apparatus of claim 1, further comprising a support member, said recording medium being supported by said support member, said developer being delivered towards said recording medium whereby said delivered developer pushes said recording medium onto said support member.

5. The electrophoretic recording apparatus of claim 4, wherein said support member is said opposite electrode.

6. The electrophoretic recording apparatus of claim 1, wherein said recording medium is intermittently fed between said recording electrode and opposite electrode.

7. The electrophoretic recording apparatus of claim 1, wherein said recording electrode comprises a main electrode and an auxiliary electrode, an insulating material for separating said main electrode from said auxiliary electrode, wherein said opposite electrode and said auxiliary electrode are kept at an equal potential, said electric field means maintaining a voltage drop between said main electrode and said opposite electrode.

8. The electrophoretic recording apparatus of claim 1, wherein said recording electrode comprises a main electrode and an auxiliary electrode, said auxiliary electrode being disposed about said main electrode, an insulating layer separating said main electrode from said auxiliary electrode, said electric field means including first voltage generating means for applying a voltage between said opposite electrode and said main electrode; and second voltage generator means for causing a voltage between said opposite electrode and said auxiliary electrode, wherein said applied voltages reverse the direction of an electric field formed between said opposite electrode and said main electrode and the direction of an electric field formed between said opposite electrode and said auxiliary electrode.

9. The electrophoretic recording apparatus of claim 8, wherein said recording medium is intermittently fed between said recording electrode and opposite electrode.

10. The electrophoretic recording apparatus of claim 7, wherein said recording medium is intermittently fed between said recording electrode and opposite electrode.

11. The electrophoretic recording apparatus of claim 1, wherein said recording electrode is elongated with a recording portion at one end facing the recording medium, said recording portion being tapered.

12. The electrophoretic recording apparatus of claim 1, wherein said recording electrode is elongated with a recording surface at one end facing the recording medium, the recording surface being concave.

13. The electrophoretic recording apparatus of claim 1, wherein said recording electrode contacts said developer on a side of said recording medium corresponding to a surface of said recording medium which receives the image.

14. The electrophoretic recording apparatus of claim 1, wherein said recording electrode and the opposite electrode contact a surface of said recording medium.

15. The electrophoretic recording apparatus of claim 1, comprising a print head and a plurality of electrodes mounted within said print head.

16. An electrophoretic recording apparatus for use with a developer including charged pigment dispersed in a dispersing medium to be affixed to a recording medium to form an image comprising:

a print head, a plurality of electric field means mounted in said print head each electric field means including a recording electrode and an opposite electrode spaced apart with a gap therebetween and adapted to receive the recording medium therebetween, the electric field means selectively applying a voltage between said recording electrode and opposite electrode;

the electric field means including electric field concentrating means for concentrating the electric field to avoid electric field spread;

said recording electrode comprising a main electrode and an auxiliary electrode, said auxiliary electrode being disposed about said main electrode, an insulating layer separating said auxiliary electrode from said main electrode, said opposite electrode and auxiliary electrode being kept at an equipotential;

developer feed means for feeding developer to said gap between the electrodes within an electric field controlled by said electric field means; and the electric field means including voltage generator means for applying at recording a voltage between said main electrode and said opposite electrode, whereby an image is formed on said recording medium in accordance with said electric field.

17. An electrophoretic recording apparatus for use with a developer including a charged pigment dispersed in a dispersing medium and a recording medium for providing an image thereon comprising:

a print head, a plurality of electric field means mounted in said print head means, each said electric field means including a recording electrode, and an opposite electrode spaced apart with a gap therebetween and adapted to receive said recording medium therebetween;

the electric field means selectively applying a voltage between said recording electrode and opposite electrode, the electric field means including electric field concentrating means for concentrating the electric field to avoid electric field spread;

said recording electrode comprising a main electrode and an auxiliary electrode, said auxiliary electrode being disposed about said main electrode, an insulating material separating said auxiliary electrode from said main electrode;

developer feed means for feeding developer to said gap between the electrodes within an electric field controlled by said electric field forming means; and said electric field means including first voltage generator means for applying a voltage between the opposite electrode and the main electrode and second voltage generator means for applying a voltage between the opposite electrode and the auxiliary electrode, whereby a voltage is applied at recording to reverse the direction of an electric field formed between said opposite electrode and said main electrode and the direction of an electric field formed between said opposed electrode and said auxiliary electrode, whereby an image is formed on said recording medium in accordance with said electric field.

* * * * *